United States Patent
Officewala et al.

(10) Patent No.: US 12,130,816 B2
(45) Date of Patent: *Oct. 29, 2024

(54) SCAN OPTIMIZATION OF COLUMN ORIENTED STORAGE

(71) Applicant: The Toronto-Dominion Bank, Toronto (CA)

(72) Inventors: Murtaza Officewala, New York, NY (US); Mikhail Dron, Ardsley, NY (US); Partha Sarathy, Jersey City, NJ (US)

(73) Assignee: The Toronto-Dominion Bank, Toronto (CA)

( * ) Notice: Subject to any disclaimer, the term of this patent is extended or adjusted under 35 U.S.C. 154(b) by 228 days.

This patent is subject to a terminal disclaimer.

(21) Appl. No.: 17/834,825

(22) Filed: Jun. 7, 2022

(65) Prior Publication Data
US 2022/0300514 A1 Sep. 22, 2022

Related U.S. Application Data

(63) Continuation of application No. 16/741,556, filed on Jan. 13, 2020, now Pat. No. 11,386,089.

(51) Int. Cl.
*G06F 16/2455* (2019.01)
*G06F 16/22* (2019.01)
(Continued)

(52) U.S. Cl.
CPC ...... *G06F 16/24553* (2019.01); *G06F 16/221* (2019.01); *G06F 16/2237* (2019.01); *G06F 16/2443* (2019.01); *G06F 16/24573* (2019.01)

(58) Field of Classification Search
CPC ............. G06F 16/24553; G06F 16/221; G06F 16/2237; G06F 16/2443; G06F 16/24573; G06F 16/2455
See application file for complete search history.

(56) References Cited

U.S. PATENT DOCUMENTS 5,649,181 A 7/1997 French et al.
5,918,225 A 6/1999 White et al.
(Continued)

FOREIGN PATENT DOCUMENTS

CN 105183898 A 12/2015
CN 105787118 A 7/2016
(Continued)

OTHER PUBLICATIONS

Bin, H. et al., "Efficiently Indexing Sparse Wide Tables in Cloud Computing," Information Technology Journal, vol. 12, No. 20, Dec. 2013, pp. 5415-5423.
(Continued)

*Primary Examiner* — Pierre M Vital
*Assistant Examiner* — Zuheir A Mheir
(74) *Attorney, Agent, or Firm* — Patent Capital Group

(57) ABSTRACT

SCAN operations for databases where scan time is dependent on a payload size consume too much memory space and computing time as payload sizes increase. A database table is configured to include an additional index mapping column that stores bitmaps related to the corresponding row of the table. Each bit in the bitmap corresponds to a column and indicates whether that column stores a value. Inclusion of an index column in a table decouples the time it takes to perform the SCAN operation on a column from the payload size of data stored in the column. The bitmaps stored in the index column are relatively small and uniform in size, so the SCAN operation on such a database requires only for the bitmap values of the applicable rows to be obtained from the index column and inspected.

20 Claims, 7 Drawing Sheets

(51) Int. Cl.
*G06F 16/242* (2019.01)
*G06F 16/2457* (2019.01)

(56) References Cited

U.S. PATENT DOCUMENTS

| | | | |
|---|---|---|---|
| 7,774,346 B2 | 8/2010 | Hu et al. | |
| 8,032,499 B2 | 10/2011 | Faerber et al. | |
| 8,161,051 B2 | 4/2012 | Kaku et al. | |
| 8,244,735 B2 | 8/2012 | He et al. | |
| 8,626,770 B2 | 1/2014 | He et al. | |
| 8,935,233 B2 | 1/2015 | Agrawal et al. | |
| 8,972,337 B1* | 3/2015 | Gupta | G06F 16/221 707/602 |
| 9,195,657 B2 | 11/2015 | Oks et al. | |
| 9,542,442 B2 | 1/2017 | Meiyyappan et al. | |
| 10,229,143 B2 | 3/2019 | Hopcroft et al. | |
| 10,318,484 B2 | 6/2019 | Finlay et al. | |
| 2005/0060293 A1* | 3/2005 | Day | G06F 16/24557 |
| 2005/0154710 A1* | 7/2005 | Ruhlow | G06F 16/2237 |
| 2011/0219020 A1 | 9/2011 | Oks et al. | |
| 2011/0264667 A1* | 10/2011 | Harizopoulos | G06F 16/221 707/E17.085 |
| 2011/0270871 A1* | 11/2011 | He | G06F 16/24556 707/769 |
| 2012/0303633 A1* | 11/2012 | He | G06F 16/2453 707/E17.051 |
| 2013/0173594 A1* | 7/2013 | Xu | G06F 16/245 707/E17.046 |
| 2014/0129530 A1 | 5/2014 | Raufman | |
| 2016/0217302 A1* | 7/2016 | Kassam | G06Q 20/3827 |
| 2016/0283558 A1 | 9/2016 | Wu et al. | |
| 2018/0089261 A1 | 3/2018 | Li et al. | |
| 2018/0165283 A1 | 6/2018 | Rana et al. | |
| 2019/0005041 A1* | 1/2019 | McKenna | G06F 16/00 |
| 2019/0057133 A1 | 2/2019 | Chainani et al. | |
| 2020/0409925 A1* | 12/2020 | Li | G06F 16/2474 |
| 2021/0049173 A1* | 2/2021 | Chen | G06F 16/2456 |
| 2021/0209088 A1* | 7/2021 | Zheng | G06F 16/2455 |

FOREIGN PATENT DOCUMENTS

| | | |
|---|---|---|
| CN | 106250523 A | 12/2016 |
| CN | 104361113 B | 6/2017 |
| CN | 109299102 A | 2/2019 |
| CN | 104750727 B | 3/2019 |
| CN | 110019343 A | 7/2019 |
| EP | 3 203 388 A1 | 8/2017 |
| WO | WO 2005/101250 A2 | 10/2005 |
| WO | WO 2013/152543 A1 | 10/2013 |
| WO | WO 2015/195726 A1 | 12/2015 |
| WO | WO 2016/180123 A1 | 11/2016 |
| WO | WO 2019/105420 A1 | 6/2019 |

OTHER PUBLICATIONS

The Mine of Information, "Apache HBase Overview," Jun. 20, 2016, 14 pages, [Online] [Retrieved on Jan. 23, 2020] Retrieved from the Internet <URL: http://moi.vonos.net/bigdata/hbase/>.

Wen, W. et al., "CORES: Towards Scan-Optimized Columnar Storage for Nested Records," ACM Transactions on Storage 15(3), Jun. 2019, pp. 1-46.

United States Office Action, U.S. Appl. No. 16/741,556, filed Mar. 15, 2021, 25 pages.

United States Office Action, U.S. Appl. No. 16/741,556, filed Oct. 15, 2021, 31 pages.

* cited by examiner

| row key 305 | column 1 310A | column 2 310B | column 3 310C | ... | column k 310D | index 315 |
|---|---|---|---|---|---|---|
| r1 | "{...}" |  | "{...}" | ... | "{...}" | "101...1" |
| r2 | "{...}" | "{...}" | "{...}" | ... |  | "011...0" |
| r3 | "{...}" | "{...}" | "{...}" | ... | "{...}" | "101...1" |
| r4 |  |  | "{...}" | ... | "{...}" | "111...1" |
| ... | ... | ... | ... | ... | ... | ... |
| rn |  | "{...}" | "{...}" | ... |  | "011...0" |

FIG. 3A

| row key 305 | column 1 310A | column 2 310B | column 3 310C | ... | column k 310D | index 315 |
|---|---|---|---|---|---|---|
| r1 | "{...}" | | "{...}" | ... | "{...}" | "101...1" |
| r2 | "{...}" | "{...}" | "{...}" | ... | | "111...0" |
| r3 | "{...}" | | "{...}" | ... | "{...}" | "101...1" |
| r4 | | "{...}" | "{...}" | ... | "{...}" | "111...1" |
| ... | ... | ... | ... | ... | ... | ... |
| m | | "{...}" | "{...}" | ... | | "011...0" |

FIG. 3B

SCAN OPTIMIZATION OF COLUMN ORIENTED STORAGE

CROSS REFERENCE TO RELATED APPLICATIONS

This application is a continuation of copending U.S. application Ser. No. 16/741,556, filed Jan. 13, 2020, which is hereby incorporated by reference in its entirety.

BACKGROUND

Field of Art

This disclosure relates generally to databases and more particularly to optimization of scanning operations within a database.

Description of Art

Databases store information as a table with designated positions in columns and rows. Each position in the table may initially store no information, and data may be stored in individual positions separate from other positions. Accordingly, each position may store a payload (the stored information) or may have no stored information (no data exists at that position). Two common retrieval queries to databases include GET and SCAN operations. A GET operation accesses and returns the requested data from the database, and databases are typically designed such that payloads can be accessed quickly. A SCAN operation returns an indication of whether a data value exists within the database (e.g., a Boolean data type), and may be used to determine whether a row in a database includes any value corresponding to a particular column or column family. For databases with a property that the time it takes to scan a column is dependent on a payload size of the data in the column (e.g., because the system reads each value from disk to RAM as it scans a row), the SCAN operation becomes increasingly resource-intensive and time-consuming at scale, particularly as payload sizes of values stored in the database increase.

SUMMARY

In databases with column-family based key value stores, values are stored in cells, where each cell is addressed by row-key, column-key (e.g., the name of the column or column-family), and versions or timestamps.

Commonly supported read operations of such databases include GET and SCAN operations. Many databases are optimized such that a GET operation for accessing a data value at a known row-key and column-key position can be performed quickly and efficiently. However, the computing time and memory resources required to perform a SCAN operation, which is a determination of whether a value exists in the database, increases as the payload size of the values stored in a column increase.

To provide an improved way to retrieve information from SCAN operations and alleviate these issues, an index column is introduced as an additional column of the tables in a database. In one embodiment, the values stored in the index column can be bitmaps (e.g., a vectors of values) describing the corresponding row. Each bit in a bitmap stored in the index column corresponds to a column of the table and is set to a value indicative of whether the column has a payload or has no stored value in the row. In one embodiment, each bit in a bitmap corresponds to a column-family and indicates whether the corresponding columns in the column-family have a value in the row.

The index column can be added as a column of a table in an existing database structure to introduce the beneficial functionality described herein. Thus this approach can be realized as a layer of an existing application using an unmodified or standard database implementation. That is, this approach is used in one embodiment without modifying the storage structure or interface capabilities of the underlying database and thus may provide a means to improve the speed and efficiency of these databases without requiring modification or update to a legacy database.

When a PUT operation initially adds a value to a database table, the corresponding bit in the bitmap stored in the index column for that row of the table is set (e.g., to "1"). Conversely, when a data value is deleted from a column, the corresponding bit in the bitmap stored in the index column for that row of the table is unset (e.g, set to "0").

To determine the presence or absence of data at a particular position, instead of a traditional SCAN operation on a set of row-keys, the system accesses the bitmaps stored in the index column for each of the rows associated with the set of row-keys. That is, instead of performing the SCAN operation, the system performs a GET operation to retrieve the bitmap payload stored in the index column for the particular row. The bitmap retrieved from the index column can be used to determine whether the associated row has a value in a particular column by inspecting the bit associated with the column to determine whether it is set to a one (indicating data is present) or a zero value (indicating no data is present). Because the index column has a relatively small data footprint in terms of memory space, retrieving the bitmap values stored in the index column consumes fewer memory resources (e.g., RAM) and takes up less computing time than a typical SCAN operation while also providing payload information for the database.

The features and advantages described in this summary and the following detailed description are not limiting and not all-inclusive. Many additional features and advantages will be apparent to one of ordinary skill in the art in view of the drawings, specification, and claims hereof.

BRIEF DESCRIPTION OF THE DRAWINGS

Figure (FIG. 1 is a high level block diagram of a system environment for a database system, in accordance with an example embodiment.

FIG. 3A illustrates an example data table that is configured to include an index column, in accordance with an example embodiment.

FIG. 3B illustrates an addition to the example data table that is configured to include an index column, in accordance with an example embodiment.

Figure 1:
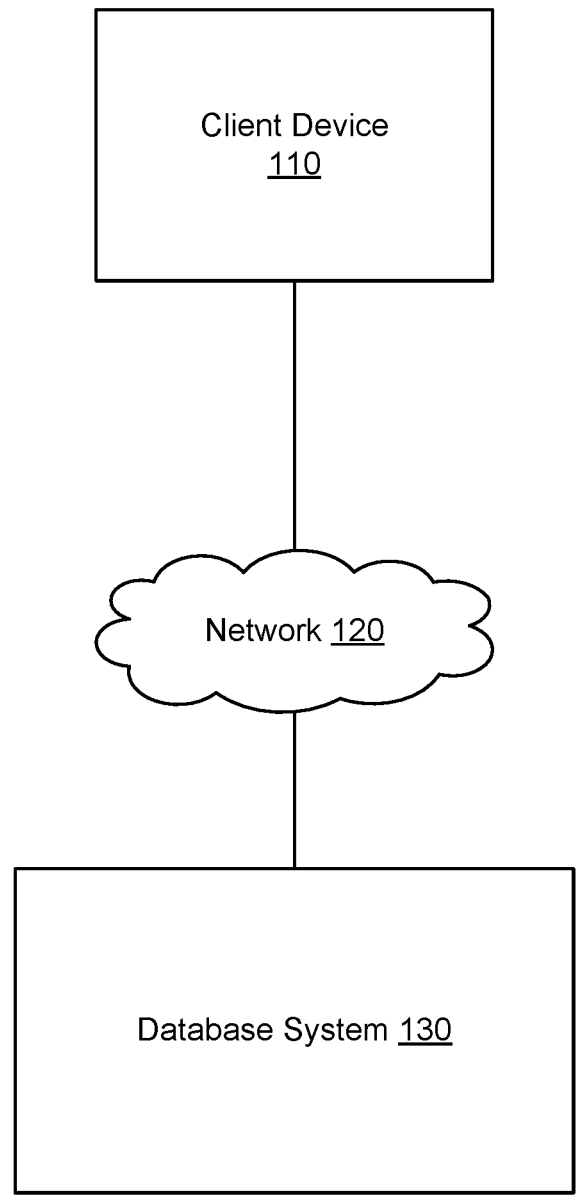

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Two commonly supported read operations of databases include GET and SCAN operations. A GET operation accesses and returns requested data from a database table. Typically, databases are configured to optimize the efficiency of performing a GET operation to retrieve requested data. A SCAN operation returns an indication (e.g., a Boolean) of whether a data value exists within the database. That is, a SCAN operation is used to determine whether a row of a database table includes a payload value corresponding to a particular column or column family of the database table. When a database is configured such that the time it takes to scan a column is dependent on a payload size of the data in the column (e.g., because the system reads each value from disk as it scans a row), the SCAN operation is increasingly resource-intensive and time-consuming at scale as the number of items stored in the database and payload sizes increase.

The present system incorporates a specialized "index column" into a database table and leverages the presence of the index column to perform SCAN operations on the database table more efficiently. Beneficially, an index column can be introduced to an existing database table by updating the schema of the database table to include the additional index column without needing to alter the other columns of the data table. The index column stores values that indicate the presence or absence of data values at each column of the corresponding row of the data table. In one embodiment, the values stored at the index column can be formatted as a bitmap (e.g., a vector of values) describing the corresponding row. Each bit in a bitmap stored in the index column corresponds to a column of the table and is set to a value indicative of whether the column has a payload or has no stored value in the row. In one embodiment, each bit in the index column bitmap corresponds to a column-family and indicates whether any of the one or more columns in the column family have a value in the row.

To determine whether data is stored at a particular position in a database table, instead of a traditional SCAN operation, the database system accesses the bitmaps stored in the index column for each of the rows associated with a set of row-keys specified in the SCAN request. That is, instead of performing a SCAN operation on the database, the database system performs a GET operation (for which most databases are optimized) to retrieve the bitmap payload stored in the index column for the particular row or rows. The bitmap retrieved from the index column can be used to determine whether the associated row has a value in a particular column by inspecting the bit associated with the column to determine whether it is set to a one (indicating data is present) or a zero value (indicating no data is present). Because the index column has a relatively small data footprint in terms of memory space, retrieving the bitmap values stored in the index column consumes fewer memory resources (e.g., RAM) and takes up less computing time than a typical SCAN operation.

FIG. 1 is a high level block diagram of a system environment for a database system 130, in accordance with an example embodiment. FIG. 1 includes a client device 110, a network 120, and the database system 130. Alternate embodiments of the system environment can have any number of client devices 110 as well as multiple database systems 130. The database system 130 stores data and may be any system hosting a database. In the examples included herein, the database system 130 is a system hosting a database with column-family based key value stores (e.g., APACHE HBASE®). In some embodiments, the data may be stored at another system or across data storage locations, and the database system 130 may provide database access services (e.g., expose an interface for accessing the database) for other systems or software components.

A user can interact with data stored on a database at the database system 130 through a client device 110. For example, a user may send a GET or SCAN request to the database system 130 from a client device 110. Client devices 110 can be personal, server, or mobile computing devices, such as smartphones, laptop computers, web servers, or desktop computers. In some embodiments, a user may use the client device 110 to add, delete, update, retrieve, or scan data stored in a database at the database system 130. In some cases, a system administrator may access the database system 130 via a user device 110 to configure a new database on the database system 130, or to add, delete, or configure database tables stored in a database of the database system 130.

The client devices 110 can communicate with the system 130 via the network 120, which may comprise any combination of local area and wide area networks employing wired or wireless communication links. In some embodiments, all or some of the communication on the network 120 may be encrypted.

Figure 2:
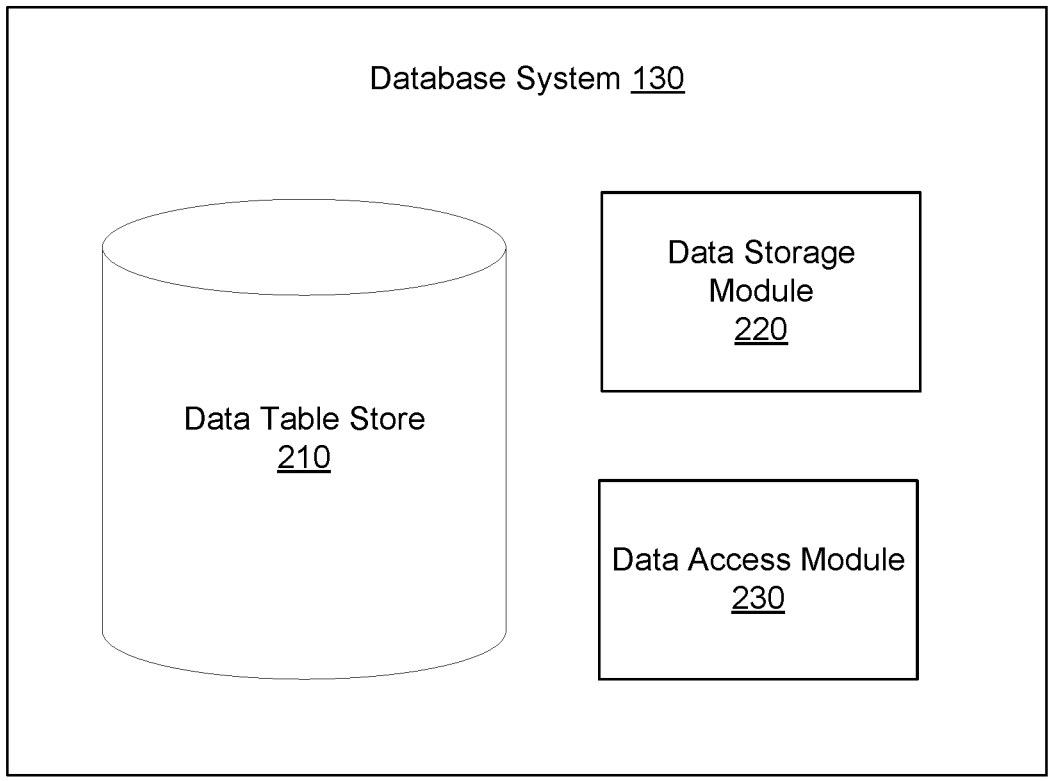
FIG. 2 is a high level block diagram of a system architecture for the database system, in accordance with an example embodiment.

FIG. 2 is a high level block diagram of a system architecture for the database system 130, in accordance with an example embodiment. The database system 130 includes various modules and datastores associated with storage of databases. The database system 130 comprises a data table store 210, a data storage module 220, and a data access module 230. Computer components such as web servers, network interfaces, security functions, load balancers, failover servers, management and network operations consoles, and the like are not shown so as to not obscure the details of the system architecture. Additionally, the database system 130 may contain more, fewer, or different components than those shown in FIG. 2 and the functionality of the components as described herein may be distributed differently from the description herein.

The data table store 210 is a database that stores data tables. In various embodiments, the database system 130 may include one or multiple data table stores 210. In one embodiment, the database of the data table store 210 is a column-family based key value database, for example APACHE HBASE®, wherein values are stored in cells of a data table and each cell is addressed by a row-key value, a column-key value (e.g., including a column family name and a column name), and a version or timestamp. The data table store 210 may be stored at the database system 130, or may be located at one or more other data storage locations (e.g., across distributed systems).

The data storage module 220 manages additions, deletions, and updates made to data in the data table store 210. In one embodiment, the data storage module 220 manages the configuration of data tables stored on the data table store 210, for example, creation of additional database tables, deletion of database tables, and changes to table schemas. The data storage module 220 also manages addition and deletion of data from tables stored in the data table store 210.

When a user of a client device 110 provides payload data to be added to a database table, the data storage module 220 identifies the location for storing the additional data in an indicated database table and stores the value at the identified location (e.g. at an identified row and column) in the data table. The data storage module 220 also updates the payload value stored at the index column of the data table. For example, if the index column stores a bitmap comprising a string of ones and zeros, and the position for storing the new data was previously represented by a zero, the data storage module 220 replaces the bitmap at the index column for the appropriate row with a bitmap that represents the position where the new data value was added with a one. In one embodiment, the storage command for updating a payload value includes two steps: storing the updated payload at the appropriate row and column of the database, and updating the corresponding value at the index column if an update is necessary. For example, to store a payload value, the data storage module 220 may retrieve the value stored at the index column for the row where the new value is updated. The data storage module 220 determines whether the index value needs to be updated, and updates the index value accordingly. Thus, in some embodiments, the data storage module 220 can subsequently update the index column value and the data payload value simultaneously. Similarly, the data storage module 220 also facilitates deletion of data values, as indicated by a user via a client device 110, by accessing and removing the indicated data value from an indicated data table of the data table store 210 and updating related information in the data table, including values stored at the index column of the data table.

The data access module 230 manages accesses to data in the data tables stored in the data table store 210. That is, the data access module 230 may access and provide data related to a database table in response to user queries received from a user of a client device 110. Two data retrieval queries that the data access module 230 supports include GET and SCAN operations.

A GET operation accesses and returns a data value requested by a user from its location in a data table of the data table store 210. In response to a GET request, the data access module 230 accesses a data payload stored at a location on a data table in the data table store 210 as specified in the GET request. For example, a GET request may specify a data table, a row-key value, and a column value to identify a cell of the data table from which the data payload is requested. The data access module 230 facilitates returning the accessed payload value to the client device 110 that submitted the GET request.

A SCAN operation returns an indication of whether a data value exists within the database. For example, a SCAN operation may return a Boolean data type indicating whether a row in a data table includes a payload value stored for a particular column or column family of the data table. To respond to a SCAN request, the data access module 230 performs a GET operation to retrieve the payload value stored at the index column of the row identified by the SCAN request. In one embodiment, the payload retrieved from the index column includes a bitmap (i.e., a vector) that has values that indicate (e.g., 1s and 0s) whether a data payload is currently stored at each column within the row. For example, in a data table with four data columns and an index column, the index column value stored in the fifth row and comprising a bitmap <1, 1, 0, 1> may indicate that at the fifth row of the data table, the first two columns and the fourth column currently store data payloads, and that the third column does not currently store a value. By checking the information from the payload stored at the index column, the data access module 230 facilitates returning a value indicative of whether a data value is currently stored at a location in the data table to the client device 110 that submitted the SCAN request. In some embodiments, the data access module 230 may return multiple values, or the entire index column value to simultaneously indicate to the requesting client device 110 which of multiple cells in a row of a data table currently store values.

Implementing use of an index column can effectively operate as a layer on top of existing database systems that support normal GET and SCAN operations. That is, with the addition of the index column, a legacy database system (that normally performs a SCAN operation by traversing individual data elements) can be modified to perform a SCAN operation by adding a layer for performing a GET operation on the index column and analyzing the value to determine information about the contents of the database row. Accordingly, the updated SCAN process and database configuration improves how the operations are performed by reducing the required computing resources and increasing the speed at which data for a row can be scanned. Furthermore, it is beneficial for the index column to be included as another column in the table because it can be accessed using existing application logic.

Some databases include a guarantee of atomicity in that all updates to a column-family for a given row-key are guaranteed to be atomic. In such cases, the bitmap in the index column is guaranteed to be transactionally consistent with the data column-families. This is due to the inclusion of the bitmaps in an index column of the same table as the data. That is, since the index column is included in the same row that it describes, a database that guarantees atomicity for any updates to the database will ensure that the data in both the index column and data value column are updated together. For example, a value at an index column may be accessed to determine whether the index value will need to be updated (e.g., during an addition or deletion of data to the row of the database) and if necessary, the index value and added payload value can be changed in a single data row write.

In some embodiments, the index column may include data other than zeros and ones. That is, non-zero values in the bitmap may be used to represent information about the data present in the corresponding position of the table. The non-zero values may be used to describe a characteristic or property of the data (e.g., metadata) at the corresponding position. Accordingly a small data value that is often searched can be retrieved easily from the index column data. For example, if an account number is often searched for in relation to a row-key, the account number could take the place of the one in the index column bitmap for that row and column so that the account number can be accessed at the same time as the index column is accessed to scan the data from the row. This concept can be expanded to include other small data values in the index column, and may include data in addition to the bitmap in some embodiments. Other examples of data that could be included within the index column for efficient access could include a timestamp of the most recent write to the row, the data size of the data stored within the row, a number of times the row has been scanned, a number of times a value in the row was updated, and the like. Furthermore, the data payload stored at an index column may be stored using various datatypes and various formats in different embodiments. For example, an index column values could be a string of ones and zeros, a string of other characters, a binary number, an integer, or another datatype for representing the presence of data in the columns of the data table.

FIG. 3A illustrates an example data table 300 that is configured to include an index column, in accordance with an example embodiment. The data table 300 includes a row key column 305, k data columns 310 (e.g., 310A, 310B, 310C, and 310D), and an index column 315. The data table 300 also includes n rows, each identified by a row-key stored in the row key column 305. Ellipses in the rows, columns, and index column values represent possible additional rows, columns, or bitmap values, respectively, for the sake of example. The example index column 315 stores bitmaps as strings of ones and zeros wherein the value at the index column 315 for a row includes a one at indices of the bitmap associated with a column storing a value and includes a zero at indices of the bitmap associated with a column having no stored value. In the example of FIG. 3A, a cell of the data table 300 storing a value is represented by the characters "{ . . . }" used to denote some stored data. In practice, these values could be a variety of data values and data types, depending on the database schema.

In an example scenario, the database system 130 may receive a SCAN request querying whether the data table 300 has a data value stored at row 2 and column 3 310C. To perform the SCAN operation, the data access module 230 accesses the data table 300 stored in the data table store 210, and retrieves the value stored at the index column 315 from row 2, as identified by row key r2. In this example case, the retrieved index value is, "011 . . . 0" which indicates that there are values stored at column 2 310B and column 3 310C. Since there is a "1" at the index position representing column 3, the data access module 230 returns the value "True" in response to the SCAN request.

Figure 3B:
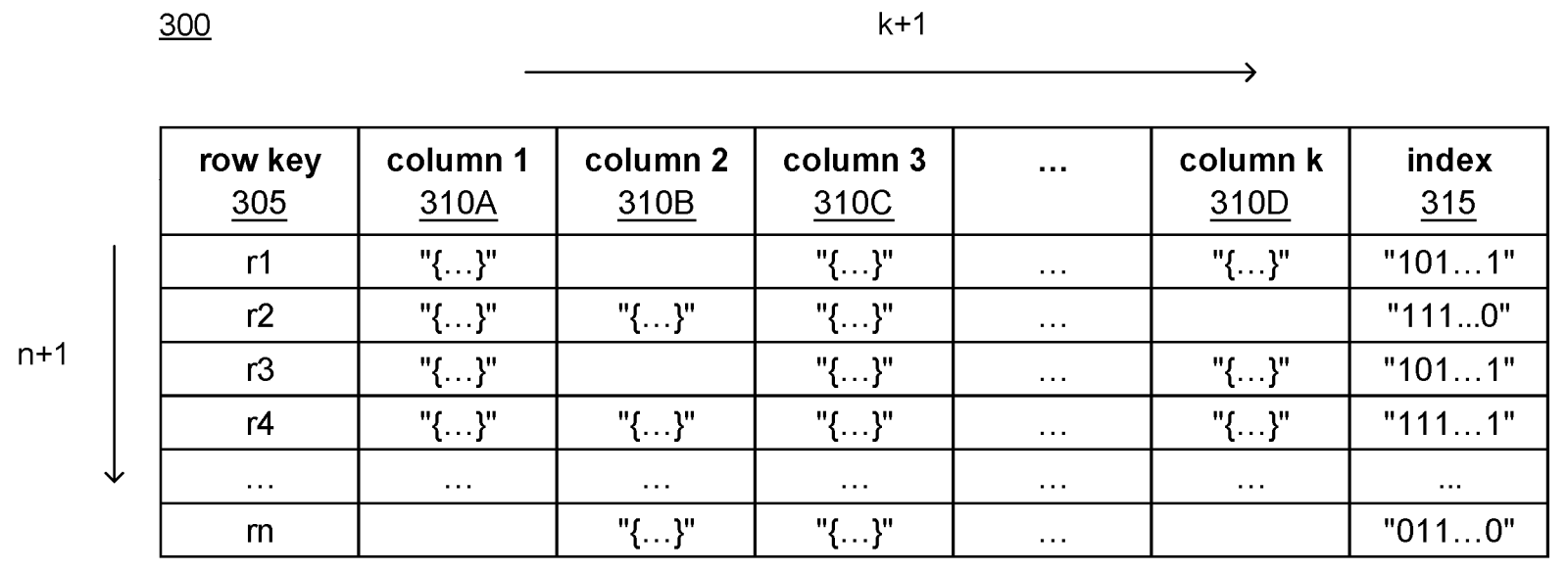

FIG. 3B illustrates an addition to the example data table 300 that is configured to include an index column, in accordance with an example embodiment. In the example scenario of FIG. 3B, a data value has been added to the cell at column 1 310A at row 2, represented by row key r2. In addition to storing the value at the cell of the data table, the data storage module 220 also updates the data value at the index column 315 for row 2. Whereas in FIG. 3A, the index value for row 2 included, "011 . . . 0", after the addition of the new value to the row at column 1, the new index value is, "111 . . . 0". When the data storage module 220 deletes a value from a cell of a data table, the data storage module 220 similarly updates the associated index column 315 value to include a zero at the index of the bitmap representing the column where data had been deleted from the row.

Figure 4A:
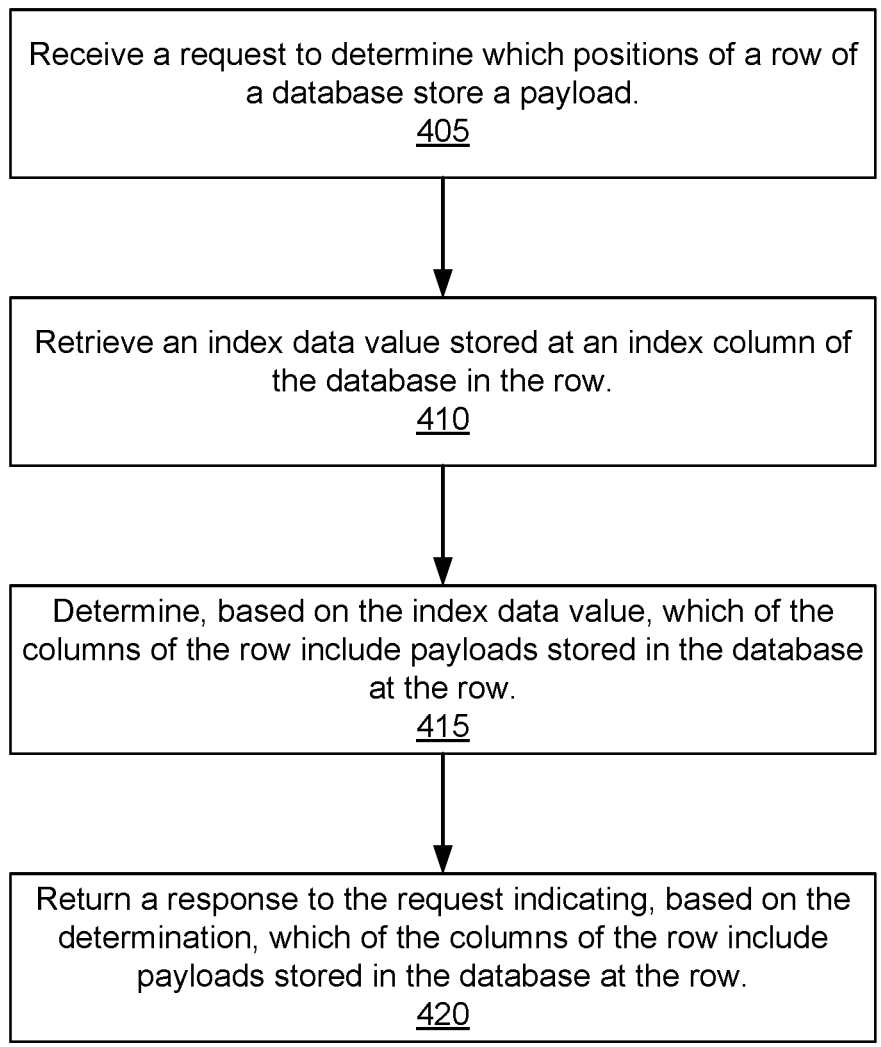
FIG. 4A is a flowchart illustrating a process for determining whether a position in a database currently stores a payload, in accordance with an example embodiment.

FIG. 4A is a flowchart illustrating a process for determining whether a position in a database currently stores a payload, in accordance with an example embodiment. The database system 130 receives 405 a request to determine which positions of a row of a database store a payload. The database system 130 retrieves 410 an index data value stored at an index column of the database in the indicated row. Based on the index data value, the database system 130 determines 415 which of the columns of the indicated row include payloads stored in the database at the row. The database system 130 returns 420 a response to the request. The response indicates, based on the determination, which of the columns of the row include payloads stored in the database at the indicated row.

Figure 4B:
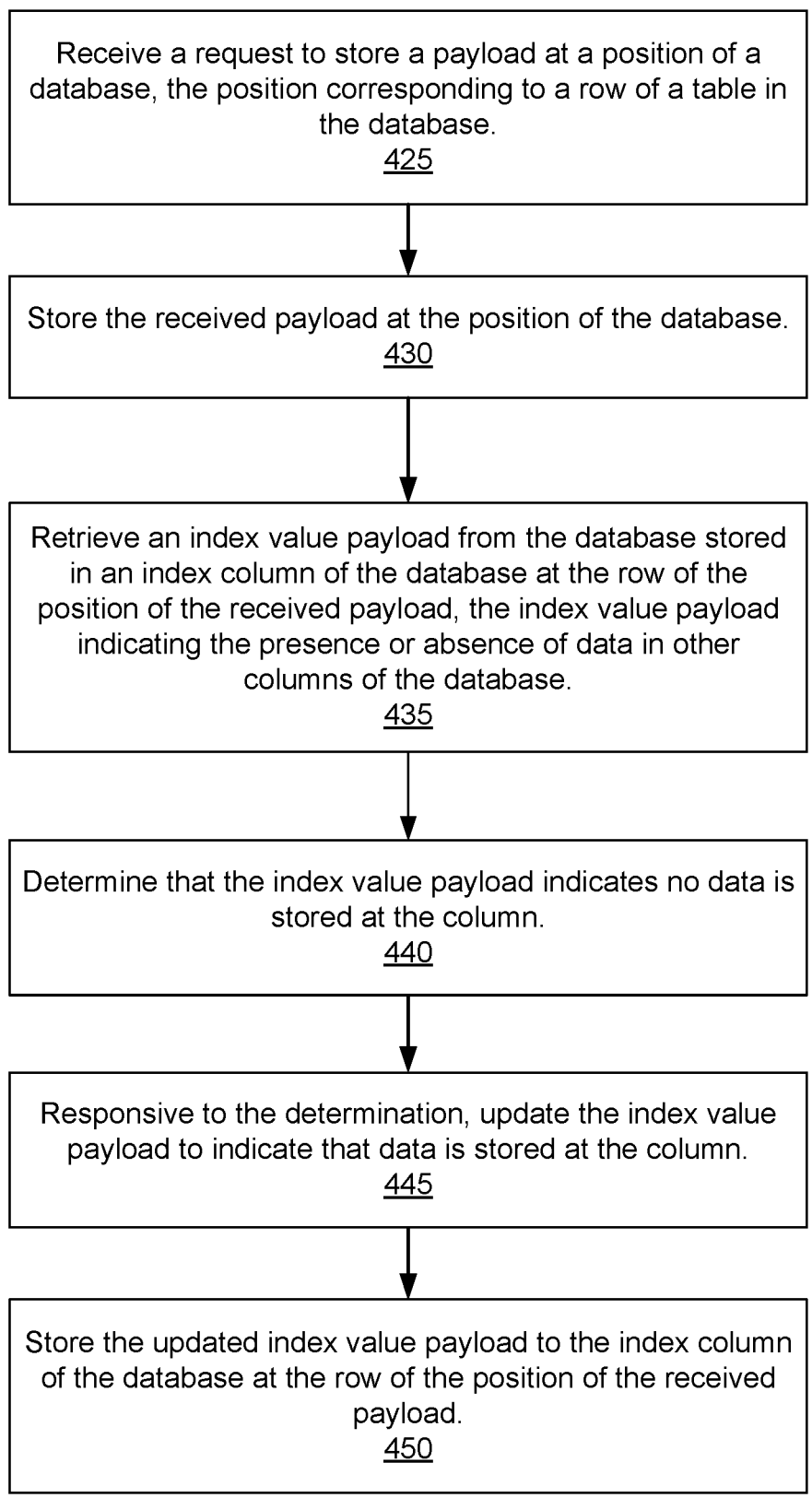
FIG. 4B is a flowchart illustrating a process for updating an index value payload in a data table of a database, in accordance with an example embodiment.

FIG. 4B is a flowchart illustrating a process for updating an index value payload in a data table of a database, in accordance with an example embodiment. The database system 130 receives 425 a request to store a payload at a position of a database, the position corresponding to a row of a table in the database. The database system 130 stores 430 the received payload at the requested position of the database, within a data table of the database. The database system 130 also retrieves 435 an index value payload from the database that is stored in an index column of the database at the row of the position of the received payload. The index value payload indicates the presence or absence of data in other columns of the database at the corresponding row. For example, the index value payload may be a bitmap that includes ones at indices corresponding to columns of the data table which currently store data payloads at the row and that includes zeros at indices corresponding to columns of the data table which do not currently store data payloads at the row.

The database system 130 determines 440 that the index value payload indicates that no data is stored at the column at which the request indicated the payload should be stored. Responsive to the determination, the database system 130 updates 445 the index value payload to indicate that data is stored at the column. For example, a zero may be changed to a one at the corresponding index of the bitmap from the index column. The database system 130 stores 450 the updated index value payload to the index column of the database at the row of the position of the received payload.

Figure 5:
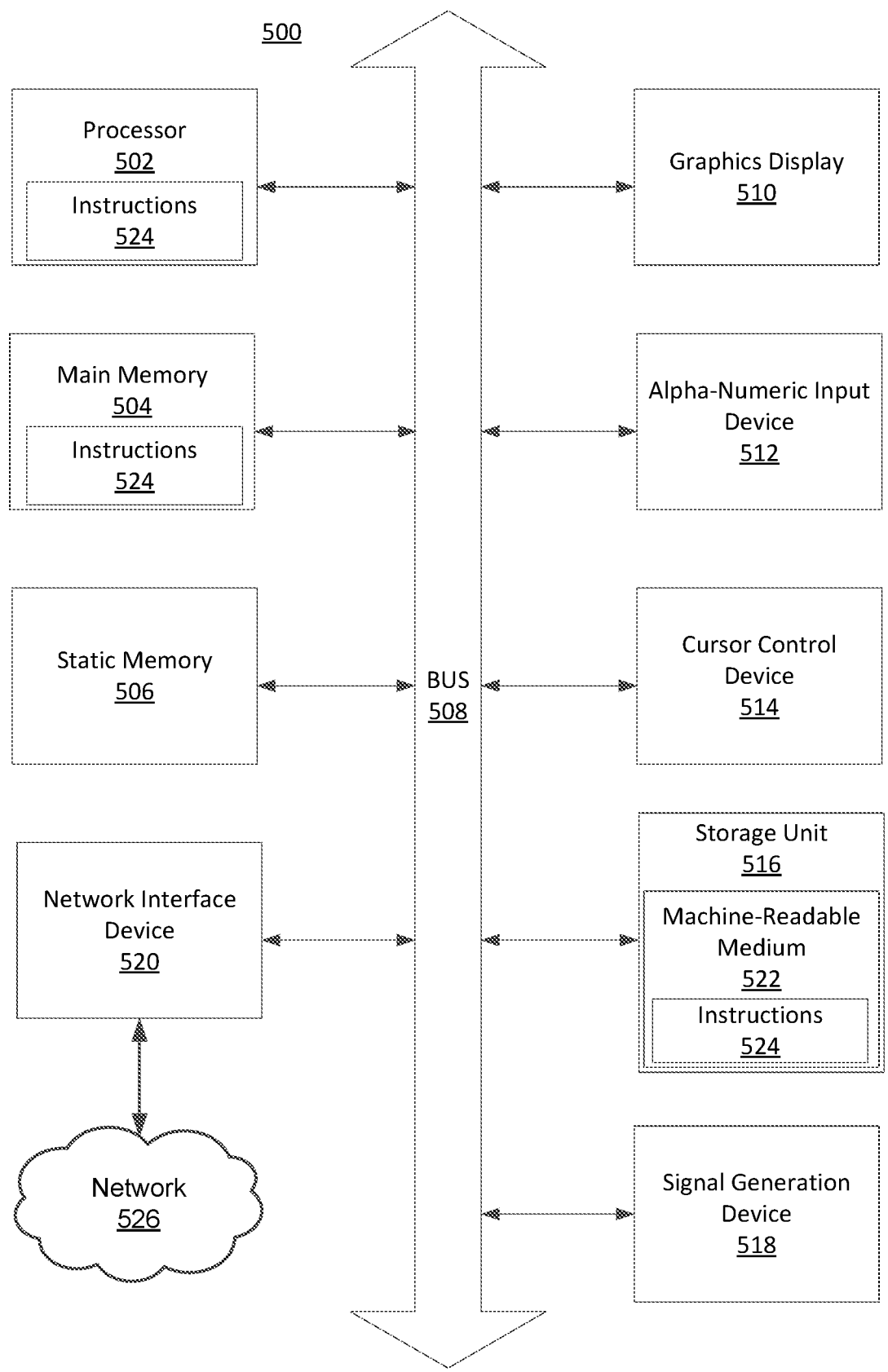
FIG. 5 is a block diagram illustrating components of an example machine able to read instructions from a machine-readable medium and execute them in one or more processors (or controllers).

FIG. 5 is a block diagram illustrating components of an example machine able to read instructions from a machine-readable medium and execute them in one or more processors (or controllers). Specifically, FIG. 5 shows a diagrammatic representation of a database system 130 in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504, and the storage unit 516 communicate via a bus 508.

In addition, the computer system 500 can include a static memory 506, a graphics display 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. For example, the instructions 524 may include instructions for implementing the functionalities of the data storage module 220 and/or the data access module 230. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer system comprising:
one or more computer processors for executing computer program instructions; and
a non-transitory computer readable storage medium comprising instructions which, when executed by a processor, cause the processor to perform the steps of:
amending an existing row-oriented database table that supports GET and SCAN operations to include an index column comprising, for each row in the row-oriented database table, a stored index data value that indicates, for each column of the row-oriented database table, whether the row has a payload of any value in that column;
retrieving an index data value stored at the index column of a row of the amended row-oriented database table, wherein the retrieving is independent of sizes of payloads stored in the row;
determining, based on the index data value, which of the columns of the row include payloads stored in the amended row-oriented database table at the row, the determining is independent of sizes of payloads stored in the row; and
retrieving a value from one of the determined columns of the row that includes a payload stored in the amended row-oriented database table.

2. The computer system of claim 1, wherein the index data value stored at an index column of the amended row-oriented database table comprises a bitmap.

3. The computer system of claim 2, wherein the bitmap is a vector that includes a 1 for each column of the row that stores a data value and a 0 for each column of the row that does not store a data value.

4. The computer system of claim 1, wherein the index data value stored in the index column for the row includes metadata represented by characters other than 0 or 1.

5. The computer system of claim 1, wherein storage in the database is idempotent.

6. The computer system of claim 1, wherein the retrieval of an index data value and the determination of whether the row stores a value at a particular column does not change the execution time and memory space used based on the size of the payload stored in the particular column.

7. The computer system of claim 1, wherein the index value describes a property of the payload data.

8. A computer-implemented method for implementing a SCAN operation in a database, comprising:
- amending an existing row-oriented database table that supports GET and SCAN operations to include an index column comprising, for each row in the row-oriented database table, a stored index data value that indicates, for each column of the row-oriented database table, whether the row has a payload of any value in that column;
- retrieving an index data value stored at the index column of a row of the amended row-oriented database table, wherein the retrieving is independent of sizes of payloads stored in the row;
- determining, based on the index data value, which of the columns of the row include payloads stored in the amended row-oriented database table at the row, the determining is independent of sizes of payloads stored in the row; and
- retrieving a value from one of the determined columns of the row that includes a payload stored in the amended row-oriented database table.

9. The computer-implemented method of claim 8, wherein the index data value stored at an index column of the amended row-oriented database table comprises a bitmap.

10. The computer-implemented method of claim 9, wherein the bitmap is a vector that includes a 1 for each column of the row that stores a data value and a 0 for each column of the row that does not store a data value.

11. The computer-implemented method of claim 8, wherein the index data value stored in the index column for the row includes metadata represented by characters other than 0 or 1.

12. The computer-implemented method of claim 8, wherein storage in the database is idempotent.

13. The computer-implemented method of claim 8, wherein the retrieval of an index data value and the determination of whether the row stores a value at a particular column does not change the execution time and memory space used based on the size of the payload stored in the particular column.

14. The computer-implemented method of claim 8, wherein the index value describes a property of the payload data.

15. A non-transitory computer readable storage medium comprising instructions which, when executed by a processor, cause the processor to perform the steps of:
- amending an existing row-oriented database table that supports GET and SCAN operations to include an index column comprising, for each row in the row-oriented database table, a stored index data value that indicates, for each column of the row-oriented database table, whether the row has a payload of any value in that column;
- retrieving an index data value stored at the index column of a row of the amended row-oriented database table, wherein the retrieving is independent of sizes of payloads stored in the row;
- determining, based on the index data value, which of the columns of the row include payloads stored in the amended row-oriented database table at the row, the determining is independent of sizes of payloads stored in the row; and
- retrieving a value from one of the determined columns of the row that includes a payload stored in the amended row-oriented database table.

16. The non-transitory computer-readable storage medium of claim 15, wherein the index data value stored at an index column of the amended row-oriented database table comprises a bitmap.

17. The non-transitory computer-readable storage medium of claim 16, wherein the bitmap is a vector that includes a 1 for each column of the row that stores a data value and a 0 for each column of the row that does not store a data value.

18. The non-transitory computer-readable storage medium of claim 15, wherein the index data value stored in the index column for the row includes metadata represented by characters other than 0 or 1.

19. The non-transitory computer-readable storage medium of claim 15, wherein storage in the database is idempotent.

20. The non-transitory computer-readable storage medium of claim 15, wherein the retrieval of an index data value and the determination of whether the row stores a value at a particular column does not change the execution time and memory space used based on the size of the payload stored in the particular column.

* * * * *